United States Patent [19]
Gorjan

[11] 4,149,114
[45] Apr. 10, 1979

[54] INDUCTION MOTORS HAVING SQUIRREL CAGE ROTORS ANALOGOUS TO COMMUTATOR MOTORS

[76] Inventor: Richard Gorjan, P.O. Box 83, Rockaway Park, N.Y. 11694

[21] Appl. No.: 510,418

[22] Filed: Sep. 30, 1974

[51] Int. Cl.² .................................... H02P 51/28
[52] U.S. Cl. .......................... 318/731; 310/166
[58] Field of Search ........... 318/48, 197, 194, 225 R, 318/225 A; 310/166, 211, 159, 112

[56] References Cited

U.S. PATENT DOCUMENTS

| | | | |
|---|---|---|---|
| 2,805,375 | 9/1957 | Morgan | 310/112 X |
| 2,842,729 | 7/1958 | Hillman | 310/166X |
| 2,914,688 | 11/1959 | Matthews | 310/166 X |
| 2,932,752 | 4/1960 | Jones et al. | 310/166 |
| 3,017,553 | 1/1962 | Homan | 310/112 X |
| 3,144,597 | 8/1964 | Lee | 310/166 X |
| 3,159,760 | 12/1964 | Olofsson | 310/166 |

Primary Examiner—Donovan F. Duggan

[57] ABSTRACT

This invention presents several meters characterized by a novel stator structure having distinct and separated energizing and exciting windings and provided with squirrel cage rotors of conventional design which are energized by induction, replacing rotors having commutator and brushes. Several species are derived in analogy to series, shunt, universal and repulsion motors, which exhibit similar characteristics, as their counterparts with commutators. As no rotating fields are considered, multipole, single phase motors and multiphase motors are repetitions of the basic single phase two pole design.

9 Claims, 9 Drawing Figures

U.S. Patent   Apr. 10, 1979   Sheet 1 of 4   4,149,114
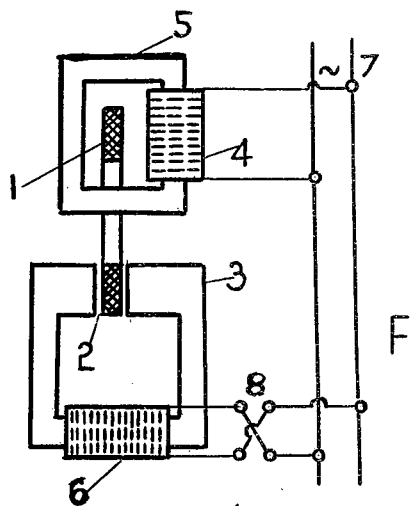
FIG.1.
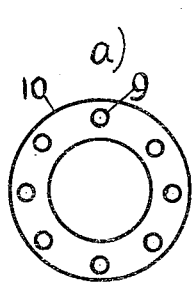
FIG.2.
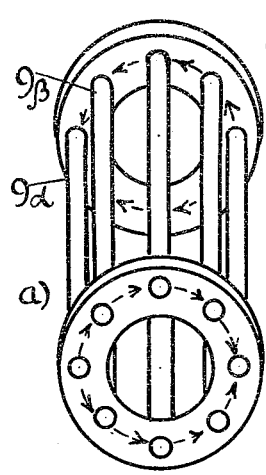
FIG.3.
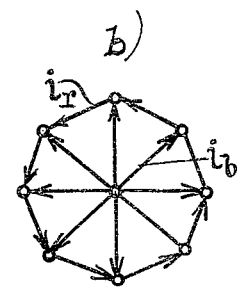
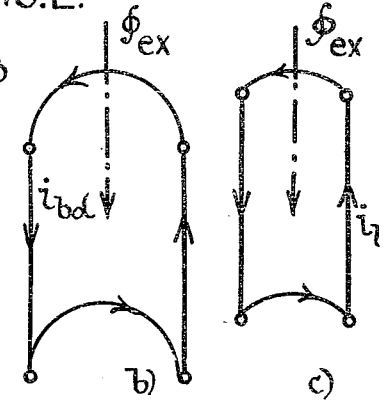
FIG.4.
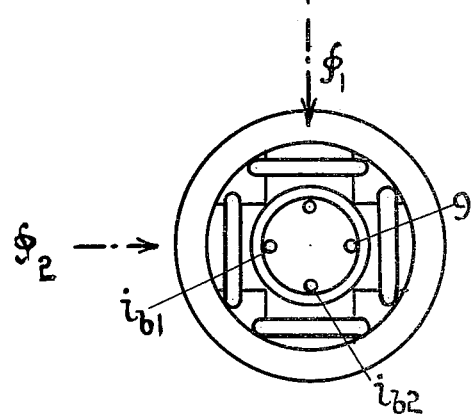
FIG.5.
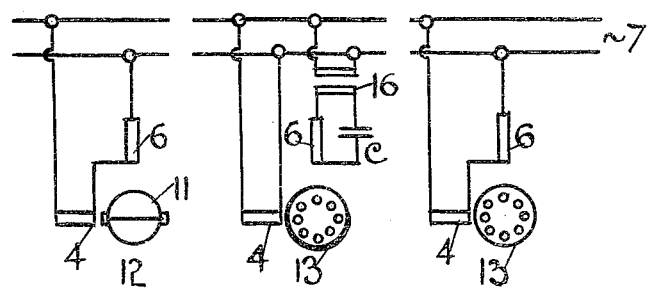
FIG.10   FIG.11a   FIG.11b

INDUCTION MOTORS HAVING SQUIRREL CAGE ROTORS ANALOGOUS TO COMMUTATOR MOTORS

BACKGROUND AND SUMMARY OF THE INVENTION

This invention relates to electrical motors and specially to motors adaptable to direct energization with AC power, as the most widespread source of modern technology of power transmission, and having the capacity fo operate at no load speeds independent of the AC power frequency. The main object was to design motors with the most desirable DC meter characteristics, but without using the commutator, a part of conventional DC meters, which is the source of a plurality of eventually unavoidable problems, including more maintainance and a short trouble free life. These problems are so popular that it is not warranted to cite them here. The most robust rotor, known to the art, is the almost standardized squirrel cage rotor, and this invention uses exclusively such rotors. A further object of the invention: to construct motors with windings easy to reproduce on machines, and to control them with known means developed for commutator motors. Such means are: rheostats in series with field windings for shunt type motors, rheostats parallel to the field windings for series type motors, and control of the energy introduced into the energizing starter windings. The design of the new meters is not limited to size or voltage.

The fundamental ideas of the invention are:

(1) The appreciation that a squirrel cage rotor can be energized by induction as a member of an independent closed ferro-magnetic path including said rotor said path including two airgap crossings of the airgap surrounding a rotor on two diametrically opposite spots of the rotor circumference. Ferro-magnetic yoke closing said path beyond said crossings, and for instance by a solenoidal winding embracing said yoke. Such system represents really a short circuited transformer comprising said winding which functions as the primary, and said rotor as the secondary short circuited winding. The fundamental theory of transformers teaches that the resulting flux of the primary and secondary winding, when the secondary is shorted, becomes a small fraction of the primary flux, which appears on the primary, for instance, say with the secondary open. This phenomenon can also be explained elementary, by the law of Lenz, namely that secondary ampere turns, generated by the primary (ampere turns), are opposing the latter. As will be easily verified later, the direction of currents in the rotor bars distributed on the perifery is, for instance in a two pole motor, quite analogous and similar to the conductor currents of a two pole commutator drum rotor, with the important difference that the winding circuit having in the rotor two parallel branches closes in the rotor with commutator through the positive and negative brush, whereas in the squirrel cage rotor of my invention, through the peripheral two rings which are shorting all ends of the conductive rotor bars.

A squirrel cage rotor is equivalent and historically derived from a drum rotor having a winding of diametrically chorded coils, in all directions of the full angle and each shorted in itself. The stator induces in such equivalent rotor winding an EMF, regardless if the latter is revolving or standing, because by rotation said coils are replacing permanently each other. This replacement is analoguous to the commutator function.

(2) the appreciation that every commutator motor can operate when the current directions of both, the exciting and energizing currents respectively of stator and rotor are reversed simultaneously, and that such motor can operate on alternating positive and negative pulses or as well on alternating sinusoidal currents.

(3) the appreciation that the exciting magnetic flux of a commutator rotor is generated independently in an independent magnetic circuit whereas the same rotor is subjected to a second flux, the so called flux of the rotor reaction, generated by rotor currents in a direction perpendicular to the exciting flux lines (axis of the neutral zone).

(4) finally it is to appreciate that a single phase squirrel cage rotor is revolving with the aid of a rotating field generated by two single phase fields in quadrature, as it is well known from the accepted theory of single phase motors, one said field generated in the stator of said motor, the other (the quadrature field) by the rotor itself during rotation, and distinctly in the rotor conductors rotating in the stator field, by an electro motive force of rotation, in phase with said stator field. It is absolutely necessary for the establishment of a uniform rotating field that the reluctance presented to said quadrator field is in the same order of magnitude (preferably equal) as that of the stator field. The motor will come immediately to rest, should said reluctance to the quadrator field be substantialy increased.

The motors of this invention operate without the aid of rotating fields, through some irregular parasitic rotating fields may establish themselves during rotation. The reluctance to both, the stator and rotor fields, respectively TO the exciting and energizing flux, are by fundamental design propositions substantially different, and they are independent from each other.

Stator and rotor circuits for the generation of said fluxes can be in parallel or in series, as in commutator machines, whereas the angle defining the mutual inclination in space can be changed by one of the presented specie from quadrator to an other inclination, in analogy to repulsion motors, which work with brushes shifted out of the neutral axis.

(5) One must also observe that the torque in every motor is proportional to the differential change of mutual inductances of stator and rotor and to the currents in both. By placing the shorted brushes in a repulsion motor in the quadrature axis (neutral zone) there will be no torque developed, because no current can flow in the rotor and in the shorted commutator brushes because the induced currents in the rotor, to the left and the right of the stationary axis of energy transfer are counter balancing each other. On the other hand by placing the shorted brushes in the said axis of energy transfer, the shorted connection between the brushes will carry heavy current, as in a short circuited transformer, but there will be again no torque, because by rotation the mutual inductance of stator and rotor coils to the left and right of the energy transfer axis does not change. Placing the brushes in an intermediary position torque is present. Based on this fact Atkinson developed his motor by leaving the short circuited brushes in the neutral zone, but spliting the stator winding in two groups, one having the axis in the neutral zone, the other in quadrature to it; this invention, including several other features and innovations of the stator structure, in most resembling the Atkinson motor, but having a commutator rotor with brushes replaced by a shot circuited rotor.

(6) It is to recall from the operation of a one phase "universal motor" with commutator, that two EMF's (electro motive forces) are active in the rotor, namely the "transformer" EMF induced by an energizing flux, and one EMF derived from "flux cutting" or rotation, generated in the armature conductors in analogy to the "back" EMF of DC motors; both EMF's do have the same frequency, they are displaced in phase for 90°, but while the transformer EMF is independent of speed, the EMF of rotation is proportional to speed.

The new proposed motor is a combination design of (1) a repulsion motor, of the type Atkinson, (2) of an universal motor, whereby both having replaced the commutator rotor by a squirrel cage rotor and (3) of a common induction motor, but as will be explained in detail later, starting and running by induced currents stemming from the stator, which must have the same phase (direction) as in the common DC motor. The possibility of such replacements is derived from the realization that both behave similarly exposed to a one phase AC field.

Summarizing: the rotors of the said 3 AC motors do have a common feature: two types of EMF's are induced in them, both in quadrature, this phenomenon is due to the circular axial symmetry of both types of rotors, but while the induced currents close in the commutator rotor through brushes, they close in the squirrel cage rotor through the shorting side rings mounted on the bases of the cylindrical rotor drum.

As will be explained later it will be evident that the novel electro magnetic device when driven as generator can be used as Tachometer, and functions in analogy to devices known as "Amplidyne" and "Synchro-s".

BRIEF DESCRIPTION OF FIGURES

FIG. 1 explains a basic experimental movement.

FIG. 2 explains the current directions in a squirrel cage rotor.

FIG. 3 the same for a rotor with brushes.

FIG. 4 the same for a squirrel cage rotor when used in combination with the present invention.

FIG. 5 explains the action of a single phase AC power on a squirrel cage rotor in synchronous crossed fields at right angle.

FIG. 10 is the circuit of the Atkinson motor,

FIGS. 11a&b, same of the new motor.

Figure 17:
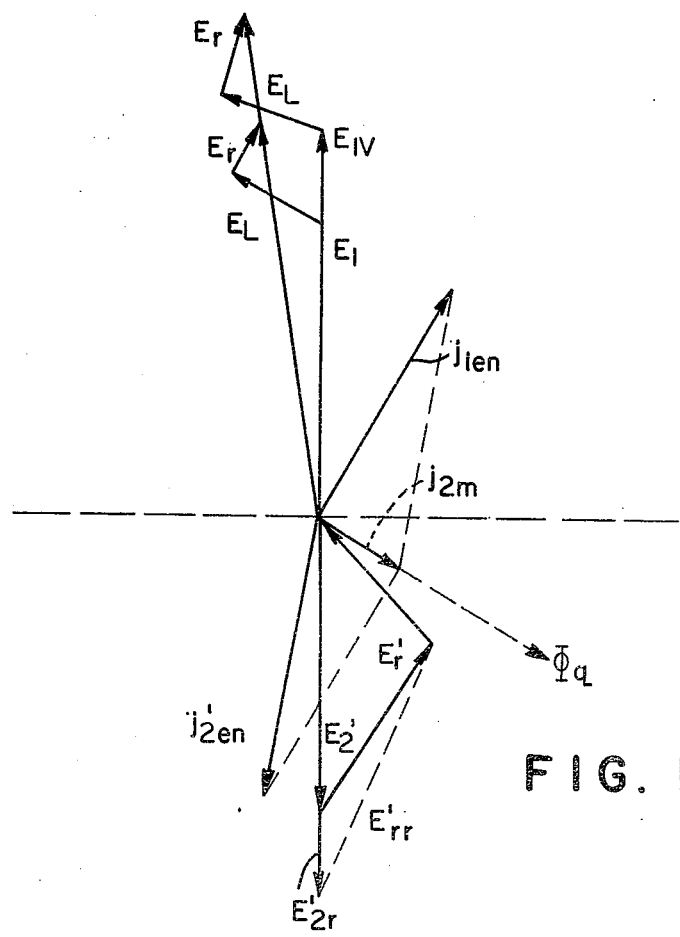

All figures from 12 to FIG. 17 explain with phaser diagrams the acting electromotive forces.

DETAILED DESCRIPTION

The proposed motor has a stator with an excitation winding as for instance the AC commutator (universal) motor, and an energizing winding which transmits AC power to a squirrel cage rotor. The latter is of conventional design. FIG. 1 describes an experiment which is basic for the new motor and comprises also exciting and energizing windings. Coil (1) is free to move (in the drawing paper vertically) up and down, in the airgap (2) interposed in the ferro magnetic yoke (3), whereas it is linked magnetically with solenoidal coil (4) through a second independent ferromagnetic yoke (5). (7) AC power line.

Said airgap (2) is tresspassed by a flux flowing in ferromagnetic yoke (3) and generated in coil (6). The AC source (7) is feeding both solenoidal coils. The mechanical force on the conductors of coil (1) (going vertically through the drawing paper) is a force of the type "Biot-Savart", here applied in an AC system, because the direction of the airgap flux emanating from yoke (3) and currents in coil (1) are changing simultaneously. It is as usual force F=prop. B L i, (B=aigrap intensity, L=length of hit conductors, i=current in conductors). (i) is the secondary current generated by transformer action of the AC energy transmitting coil (4). Coil (4) is the energizing winding of the device. Coil (3) functions as the exciting winding, because it has only to establish the flux in airgap (2). Two device analogies can now be defined for DC and AC systems based on the Biot-Savart law: (1). Changing the directon or phase of the airgap flux (eventually with commutator (8)) will change the direction of motion of coil (1). (2) The necessary exciting energy consumated in coil (6) is only a small fraction of the energy necessary in coil (4) say 5 to 10%.

The new motor will have also two independent ferromagnetic yokes for the conduction of fluxes, corresponding to yokes (3) and (5) and two windings (preferably solenoidal coils), one energizing and one exciting winding. The new rotor will cary in shorted bars currents differently phased as in an induction motor known to the art. FIG. 2a shows such rotor and 2b the phase relationships of rotor bar currents ($i_b$) and rotor ring currents ($i_r$).

The phaser diagram FIG. 2b expresses geometrically the result of an accepted theory, for conventional rotors (10) (calling two adjacent bar currents $i_{b1}$ and $i_{b2}$ it is vectorially the ring current $i_r = i_r = i_{b1} + i_{b2}$; with m=the number of phases or rotor bars it is $i_r = i_b/2 \sin \pi/u$).

FIG.(3) on the other hand shows the current distribution in a commutator rotor, here for clarity represented by a Gramme type rotor. (11)

A trespassing AC flux ($\phi$) stemming from the stator (in the direction shown) will induce currents as marked, in two parallel branches, which are short circuited by a conductor between two brushes both placed along a ring diameter parallel to the inducing flux.(12) Without said external connection between the brushes, there would be no current in the rotor, because the currents of both said branches are opposing each other in the toroidal winding.

FIG. 4 shows the current distribution in a squirrel cage rotor(13) of the new motor, as opposed to FIGS. 2 and 3. Also here the direction of the inducing flux ($\phi$) is shown as marked. The direction of currents in the bars is in opposition to the left and right of the vertical symmetry line of the rotor, as in FIG. 3 but the currents close as marked in the rotor ring conductors joining the rotor(9$\alpha$,$\beta$) bars on both ends. Such rotor, comprising the system of conductive bars and the ferromagnetic drum having embedded said system, represents in fact the secondary of a short circuited transformer of which the primary comprises a solenoidal coil located in the stator and being the source of said flux($\phi$). The currents in the rotor as currents of a short circuited secondary will set up a rotor field about in phase opposition to the flux(φ), so that the resulting field will be negligible.(-Later assumed to be zero).

FIG. 5 shows a squirrel cage rotor under the influence of two fluxes ($\phi_1$) and ($\phi_2$) of the same phase and magnitude crossing under a right angle and generated in solenoidal coils of a stator. At standstill it is appreciated that current ($i_{b1}$) induced by ($\phi_1$) will react according to Biot-Savart with ($\phi_2$), while current ($i_{b2}$) induced by ($\phi_2$) will react accordingly with ($\phi_1$); However, the forces stemming from both interactions are opposing each other (observation of the elementary hand rules). It is understood that the rotor will not move.

Figure 6:
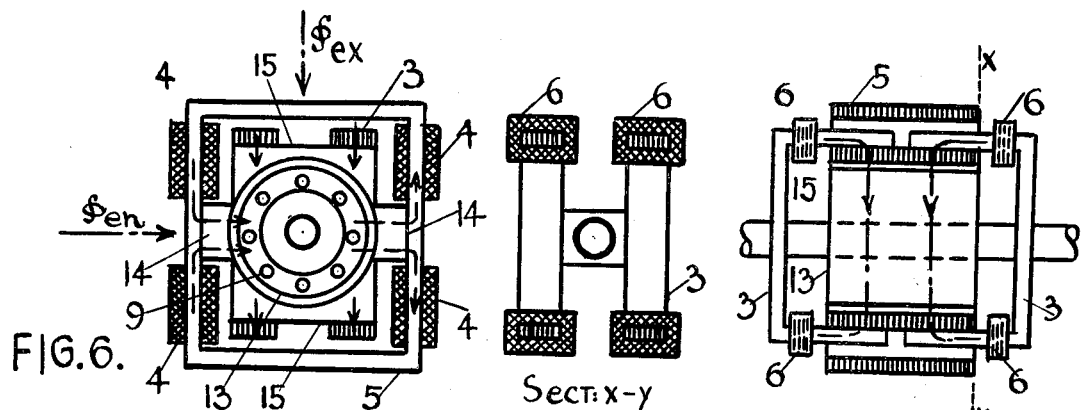
FIG. 6 and FIG. 6N show a design with two crossed fields as proposed in this invention.

In FIG. 6 flux $\phi_1$ may be considered as the flux of excitation $\phi_{ex}$, while flux $\phi_2$ the flux of energization or energy transfer from stator to rotor $\phi_{en}$ (the negligible or comparatively small flux resulting from the said transformeraction). So, that both fluxes, in space at right angle, and of substantially different magnitude, are again producing two opposing torques, but of different magnitudes, and the rotor will move. Namely both torques are proportional respectively to: $\phi_{ex} \cdot i_{en}$ & $\phi_{en} \cdot i_{ex}$; $i_{en}$ being the rotor current induced by $\phi_{en}$, and $i_{ex}$ the rotor current induced by $\phi_{ex}$. but according to the teachings of FIG. 1) the applied energy in the axis of $\phi_{en}$ is substantially larger then in the axis of $\phi_{ex}$.

Lets put the events for clarity in figures. Proposing for the gap induction under the exciting pole piece 6500 Gauss, and a gap length of ½ mm; the exciting ampere turns $AT_{ex}$ must be according to :6500=4π/10. $AT_{ex}$ .devided by (2 1/20); or 780; for both gaps. For the entire exciting flux path we approximate 1000 $AT_{ex}$. Leakage fluxes (which do not link the rotor) are included in this figure. For the production of 1000 AT we need according to formula: $W/AT=\delta \cdot \rho \cdot L_m$ watts (with W=consumated watts, $\delta$=A/mm²(=3) and 1/$\rho$=conductivity of the coil conductor; $L_m$=length of the mean turn of the coil in meters) about 25 watts; with $L_m$=½ m for a 250 w motor (disregarding in the following calculations any conversion efficiency, because it is not essential). Then the torque produced on the rotor by the energizing winding will be approx. 7.5 kgcm at 3000 RPM, while the torque produced by the exciting coil will be approx. ¾ kgcm, because, as proposed, both acting torque producing primary coil current are in phase, the torque of the energizing winding will prevail. We must complete this analysis by including the calculation for the start. There are two transformer primaries, both acting on the short circuited rotor, having their energy transfer in two perpendicular axes. The energy induced in the energizing axis is about for one order of magnitude larger then the energy transfer in the exciting axis. We can therefore neglect the energy impact on the rotor circuit derived from the exciting axis transfer. The energizing axis transfer imparts therefore on the rotor a preferred and distinct directional sense, in the same way, as brushes this do on the commutator rotor.

As the rotor may be replaced, as said by a system of diamterically chorded coils in all directions, every such coil may be replaced by a coil pair, located in two perpendicular planes, say, one parallel to the energizing axis, the other perpendicular to it. Or in an other way of observation in coils as represented in figure. Then all coils will be energized perpetually in every position by stator coils parallel to it. Recapitalating: the entire cage of the rotor is being replaced by two systems of coils (as in FIG. 4) both systems parallel to one of the proposed energy transfer axis. Both systems of coils however do have in common both lateral shorting rings of the cage cylinder. We again neglect the coil system or the existence of the system induced by energy which is for one order of magnitude smaller then the greater, and by consequence it remains only the system vertical to the energy transfer axis, while the system parallel to the exciting axis is not more in consideration. That is the reason, why the exciting transformer may be considered as working on an open secondary, the coils left over being parallel to the exciting flux $\phi_{ex}$, while the energizing transformer as with a shorted secondary, with $\phi_{en}$ perpendicular to the cage coils. At start therefore the torque prop. to $\phi_{ex} \cdot i_{en}$ will prevail over the torque prop. to $\phi_{en} \cdot i_{ex}$, for at least one order of magnitude. Beside this, because of the prposed geometry, approx. ⅔ to ¾ of all bars will be exposed to the flux $\phi_{ex}$, while only ⅓ to ¼ to the flux $\phi_{en}$". It is to note, that according to the teachings of FIG. 5, currents Iben and Ibex are opposing each other in periferal shortening rings of the squirrel cage rotor, so that Ibex practically cannot develop. The net resulting torque is analogous to the torque of a single phase commutator motor, or a so called universal motor, with the important innovation that a combination of brushes and commutator was omited.

FIG. 6 shows also a fundamental design feature. The energizing flux enters and leaves the rotor under pole pieces (14) which extends under an arc substantially smaller then the pole pieces (15) pertaining to the exciting flux. Figurally both pairs of pole pieces are comparable to the commutating interpoles and main exciting poles of conventional DC motors. The width of the exciting pole pieces (15) must face through the airgap surrounding the rotor, the maximal possible number of rotor bars, for interaction. On the other hand the geometry of FIG. 6 shows, that pole piece (14) must be narrow to link by induction (transformer action) the greatest possible number of rotor bars. To see in FIG. 6a.

The design of FIG. 6 comprises eight exciting solenoids (6); (4 on each side of the symmetry axis) and four energizing solenoids. (marked (4)). In FIGS. 6b &c, coils (4) not shown.

Figure 7:
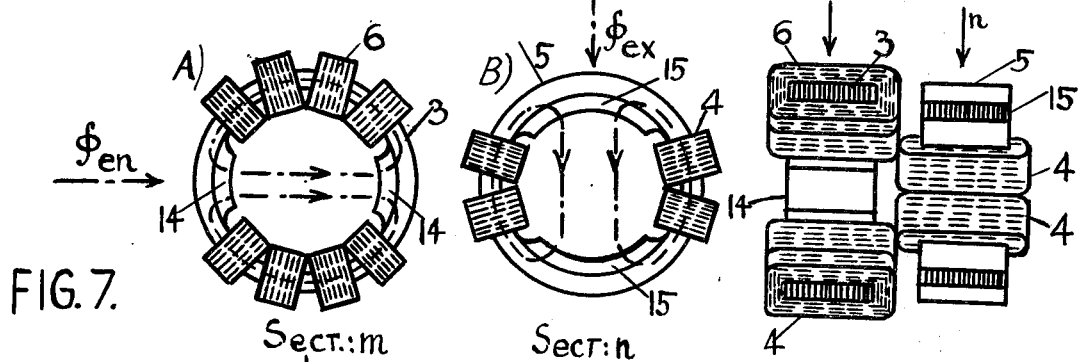
FIG. 7 shows an other structural variation for the stator of the invention. (Rotor removed for clarity).

An other specie of the invention shows FIG. 7 with ringlike stator sectins (FIG. A and FIG. B), the first for the energizing flux the second for the exciting flux. The rotor is extended axially so, that rotor currents may interact with the exciting flux under the exciting pole pieces (15) and simultaneously be linked to the energizing winding (6) and pole pieces (14). FIG. 7C shows the motor in section through the rotating shaft. FIG. 7 proposes that the axes of both fluxes (energizing $\phi_{en}$ and $\phi_{ex}$ the exciting flux) be perpendicular to each other. A construction is possible but not elaborated in detail, because it is a job of conventional mechanical engineering, which would realize a rotation of both stator rings against each other, having similar purpose as the rotation of the short-circuited brushes of a repulsion motor out of the quadrature axis versus the direct or transformer axis. Then the axis of both fluxes will not be more perpendicular against each other.

The ringlike stator design with solenoidal coils, which are not embracing the rotor, has the advantage that the coils may be manufactured easy on machines and mounted and fixed also, by splitting the stator rings along the centerlines of pole pieces (pole piece (14) and pole piece (15)) to free the ends of the split rings for sliding over said rings as cores to the relative coils. FIG. 7 has preferably an application for small motors. But it is to note, that the novel motor, as induction motor, is sensitive to the leakage of both fluxes, because flux leakage degrades the overall efficiency.

Figure 8:
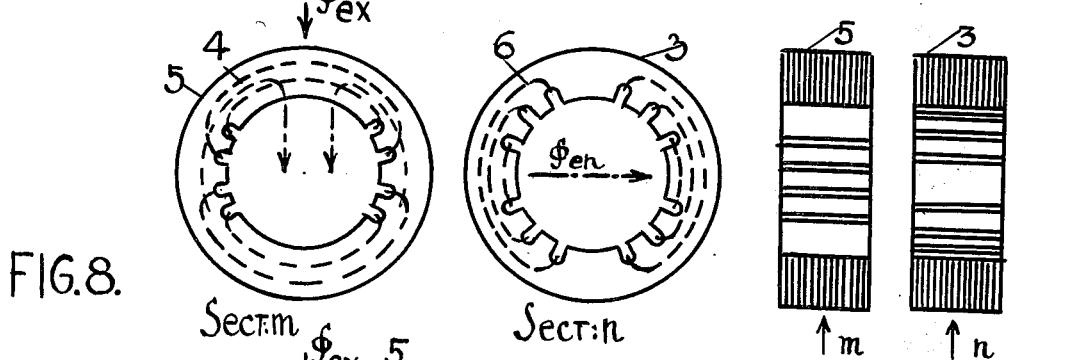
FIG. 8 shows one more structural design adaptable for larger units. (Rotor removed).

To overcome a substantial part of leakage and specially for larger and very large size motors, the construction of FIG. 8 is proposed, where the coils of the stators embrace the rotor, whereas the stator rings serves only for closing of the paths of the generated fluxes. The windings are chord-windings embedded in slots of said rings, parallel to the rotary shaft. FIG. 8 shows the direction of both fluxes ($\phi_{en}$ and $\phi_{ex}$), which are perpendicular to each other.

In FIGS. 8a & b windings are indicated by dotted lines.

FIG. 9a is a cross section of the motor, while FIGS. b & c are showing two alternatives of this specie: (b) having one energizing stator (3) and two exciting yokes (5); (c) with two stators (3) and one exciting yokes (5). In both systems the exciting flux enters radially into the rotor and then bends for 90° to flow parallel to the rotational shaft. This homopolar version of the invention is suitable for minimotors, where the unequal magnetic impact on the shaft is tollerable, while it is easy to build this system with a minimum of leakage fluxes, which are more likely to degrade the design of small units.

Also here the axial extension of the rotor must be such, that rotor bars are as long as both axial extensions of the energizing (3) and exciting (5) ring yokes, plus for the interspace of both rings, necessary for the location of winding turns and ends.

An inclination of axes of $\phi_{en}$ and $\phi_{ex}$ can be achieved by winding the excitation winding in two groups of slots, one for chords having the axis perpendicular to the energizing winding, the other parallel to it. By variation of the excitation currents in both excitation windings an effect can be achieved similar to the rotation of $\phi_{en}$ against $\phi_{ex}$, an idea proposed by Atkinson for his repulsion motor with commutator.

It is possible to wind both windings shown in FIG. 8 on the same stator, so far the space allows such job. Such motor may also rotate, but on a rotating field set up by the exciting flux $\phi_{ex}$ and a flux generated by rotation of rotor bars in said flux, which is, as it is well known to the art, in quadrature in time and space. The operation of such motor will not be conformed with the conditions set and described for the invention, because the fluxes $\phi/_{en}$ and $\phi_{ex}$ are interfering with each other in the common ferromagnetic path of the stator yoke, and the rotating field is irregular.

Figure 9:
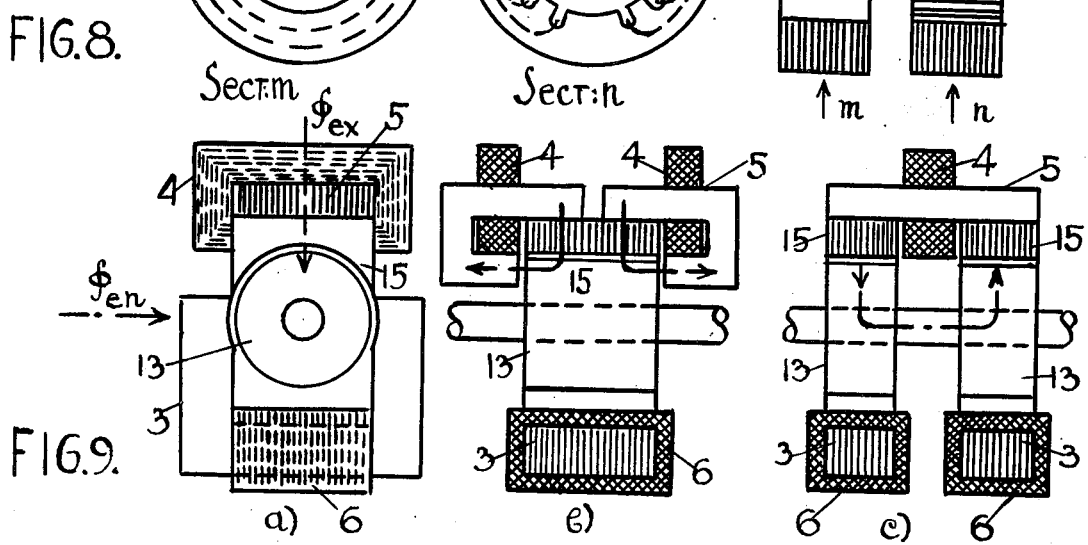
FIG. 9 presents a structural variation for crossed fields as proposed for homopolar induction motors.

Finally one more specie and subspecie of the invention is shown in FIGS. 9A, B and FIG. 9C. We see again an energizing yoke (3) and coil (4), and an exciting yoke (5) and coils (6), or respectivelly the subspecie in FIG. 9C with two rotors and one coil (6). It is to note the emphasis, that the interaction of flux $\phi_{en}$ of FIG. 9B as shown with the rotor takes place under the same geometrical circumstances as in a DC homopolar machine, as the rotor bars are interacting electro magnetically always with the same pole denomination. The device explained in FIG. 9 is therefore a homopolar induction motor. The arrows are showing the flow of the exciting flux. In FIGS. 6, 7, 8, 9, motor housing and shaft bearings are not.

It exists therefore a similar analogy between a normal DC machine and an Universal machine, as between a classical Homopolar machine and the AC apparatus shown in FIGS. 9a, b, and c. However, besides this analogy there is an important identity: namely the exciting flux tresspasses in his loop only once through an active airgap of the rotating apparatus (as opposed by normal DC machines and all AC machines, in which said flux tresspasses two working airgaps); the instant flux leaves the body of the rotor laterally through inactive airgaps as for instance in a twin homopolar machine (see page 172 of the text book by Levi-Panzer, DOVER publ.) defined between the stator and the base surfaces of the rotor cylinder. In an other subspecie, as shown in FIG. 9c, the instant flux, after bending for a right angle in an axial direction, leaves the domain of the rotor cage laterally through the bars shorting ring, still in a ferromagnetic medium. The devices shown in FIG. 9 thus can be called: AC-, or SEMI-, or QUASI- Homopolar machines.

The analogy to universal commutator motors is still expandable. The excitation coil can be operated in parallel or series to the energizing coil. Compounding is also feasible. Both coils can be operated according to special conditions through power or control transformers connected to the main power line. Speed control can be achieved with similar means known for commutator motors, namely as said with rheostats in the energizing and exciting circuits, for shunt type motors, or with rheostats parallel to the exciting circuits in series type motors. The operation "field weakening" of the exciting flux can also be realized with a variable reluctance in the exciting yoke. Namely a cylindrical hole is cut out in an elongated portion of the yoke, having the axis vertical to the flow of the flux. Within the hole is rotatable around the same axis an elongated member with cylindrical end faces fitting closely against said hole. For flux control it can be turned around said axis to two extreme positions: parallel to the flux and in quadratur to the flux, thus producing the maximal reluctance in the path.

The novel electro magnetic device can also be used for generation of AC power or currents by driving of the short circuited rotor and picking up what is being generated on the terminals of the energizing winding.

This action may be explained with the aid of FIG. 1. Supposing coil (6) carry DC current, and coil (2) would be moved out of the airgap. A DC current would be induced in coil (2) because of the motion in the airgap. Also a flux would be established in yoke (5), but nothing induced in coil (4). But if the coil (6) carry AC current, the flux in yoke (5) will be AC, and an EMF will be induced in coil (4) of the same frequency. Such device as generator has an application (1) as Tachometer, (2) as a type of "Amplidyne" in analogy to the so called DC commutator machine, with the advantage, that electronic amplifiers which might be incorporated in the system, can be of the AC type instead of the more costly and drigting DC amplifiers.

The main physical and geometric dimensions for the novel motor can be calculated straight forward with well established formulas of the technology of rotating electrical machinery.

The diameter of the rotor exactly as the diameter of a commutator universal motor having the same specifications. Also the exciting coil can be calculated as the exciting coil or "field-winding" of the same motor. The energizing coil is as said the primary of a transformer and is computed as the primary of a standard transformer, for power, voltage and current corresponding to the rating of the motor.

The best description and insight of the operation of the novel motors is gained by the analysis of the phaser diagram of vectors of involved currents and electro motive forces. Also this phaser diagramm development is quite analogous to the well established diagramm of the Atkinson motor. For better identification there are compared in FIGS. 10 (Atkinson) and 11a and 11b (the new motor) the circuit schematics of both motors. FIG. 11a shows a shunt connection, 11b a series connection. The phasers are first presented for 11a, what is the more general case, while the alternative 11b is treated as special case later. At this stage it must be emphasized the distinct analogy with a one phase commutator motor having incorporated rotor-reaction field-compensation. While the compensating winding of DC motors is normally inserted in series with the armature, with AC motors it is as routine shortcircuited in itself, thus there is the function of a short circuited transformer: to throttle the mutual transformer field, resulting from the geometrical summation of the primary and secondary fields. For the energizing transformer action of the instant invention, the reverse flow of energy is forseen: namely the energizing stator winding is feeding the shortcircuited rotor, while the mutual field is being throttled. Only due to this fact, the new motor functions. It is also to recall, that also the exciting system represents a shortcircuited transformer, having the secondary currents opposed by the much stronger energizing system, so that in the exciting system no secondary current can flow. The exciting transformer behaves therefore as open circuited.

Figure 12:
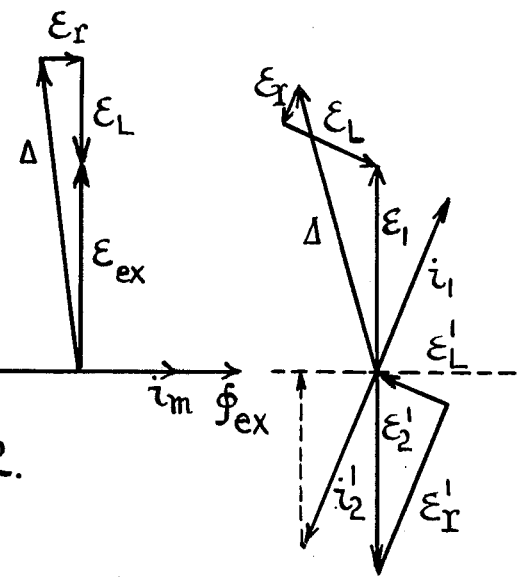

But even should the exciting power approach the power of the difference between a series commutator motor on one side, and a Repulsions motor and the motor of the instant specification on the other is that the latter motors consum a magnetizing current in the stator, capable of magnetizing the energy transfer from the stator to the rotor. FIG. 12 shows the diagramm of the exciting winding for the motor system having a rotor with the secondary conductor system open, for instance without the lateral shorting endrings. This does not demand for further explanations because it is the accepted diagram of a transformer with open secondary. ($\Delta$=terminal voltage, $E_{ex}$=induced voltage, $E_r$=voltage consumated by the ohmic resistance, $E_L$=voltage consumated by the leakage reactance). The field is in quadrature laging the induced voltage ($i_m$=the corresponding magnetizing current). This diagram must be used for the system because as it was already said before, a rotor current by transformation ($i_{2ex}$) cannot exist in consideration of the substantially stronger opposing current ($i_{2en}$), resulting from the transformer action of the energizing winding. For the exciting winding the rotor is an open circuit.

Figure 13:
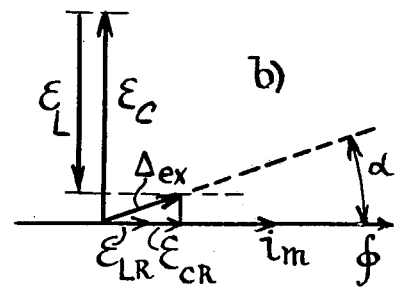

FIG. 13 shows the diagram of the energizing transformer, with the rotor inserted as secondary, but at standstill, and without the excitation of the excitation winding. Also this diagram is well known to the art, as the case of a short circuited transformer. ($E_1$ and $E_2$ are the primary and secondary induced voltages, $i_1$ and $i_2$ the relative currents; all the primed characters mean that the respective vectors are transposed to the primary). The approximation that both currents are in exact phase opposition and that the mutual transformer field is zero, is for our present purposes permitted. $E_2$ is consumated for the internal electro motive forces of the rotor only, that is $E_r$ and $E_L$.

Figure 14:
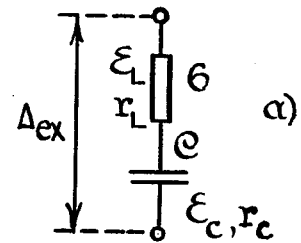

According to the teachings of FIG. 1 and paragraph (2) of the "background", it is desirable and necessary for torque production that $i_{2en}$ and $\phi_{ex}$ be in phase or counterphase; comparing FIGS. 12 and 13 we see that only a small component of $i_{2en}$ satisfy to this condition (the projection of said current on the horizontal axis). (In phaser diagrams $i_2'$, which is the secondary current $i_2$ transposed to the primary, stands for $i_{2en}$). Small motors may start under such circumstances, but for larger units under heavy loads the phase of $\phi_{ex}$ must be adjusted (shifted). There are known to the art numerous means for the achievement of this goal. I shall elaborate here only the simplest, namely the insertion of a condenser in series with the exciting winding. Condensers are simple and durable, also reliable components demanding for little attendance and consume only about 3% energy of their ratings. Such introduction makes the system flexible and adaptable to many demands regarding start and operation. FIGS. 14(a) and (b) are showing the vector diagram of a series connection of an inductance and a condenser (with losses). Because the diagram is elementary, it should be mentioned only that the effect of the condenser is that the quadrature lag of the current $i_m$ was reduced to the angle $\alpha$.

Figure 15:
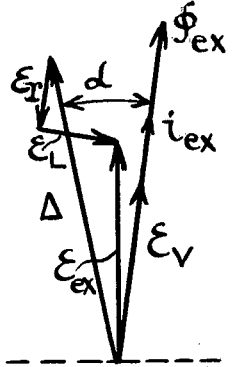

Redrawing now FIG. 12 as FIG. 15 with the angle $\alpha$, the condition for motor starting are satisfied. Insertion of an exciting transformer may be necessary for terminal voltage $\Delta_{ex}$ adjustment. See FIG. 11a (16).

Figure 16:
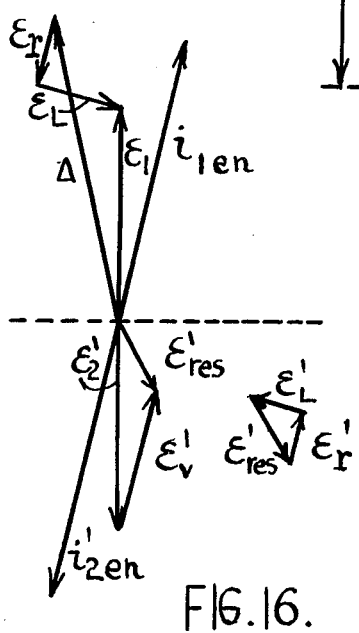

FIG. 16 shows the diagram for the energizing winding while the motor revolves. In phase with $i_{ex}$ and $\approx i_{1en}$ is the electromotive force $E_v$ (see FIG. 15) (see also $E_v$ introduced in FIG. 15) generated by rotation of rotor bars in the exciting field $\phi_{ex}$. This force was already mentioned in par. (4) of the "background", and is analogous to the counter electro motive force acting on the brushes of a commutator machine and generated in a commutator motor. It is here to recall all what was said for FIG. 1, when coil (1) is moved in the airgap). Also here it is in phase opposition the current $i_{2en}$ and figures as a resistive load, or in other words, the energizing transformer is while the motor revolves not more to be considered in short circuited condition. In quadrature to $E_v$ laging is being established a flux $\phi_q$ in the rotor, and it should be called quadrature flux in analogy to the Atkinson motor.

To maintain said flux (in analogy to the common transformer), and which was zero at start, must flow into the energizing winding a magnetizing current $i_{2m}$, which substracted vectorialy from $i_{1en}$ gives $i_{2en}$, as in the common transformer. $E_v'$ adds also vectorialy to $E_{2en}$ giving the resulting force acting in the short circuited rotor ($E_{res}$). This is then consumated for rotor resistance, and leakage reactance as the diagramm shows. As $i_{1en}$ is quasi in phase opposition to $i_{2en}$ and about in phase with $i_{ex}$ of FIG. 15 the condition for torque production are met.

Refering now to FIG. 11b it is seen that in a "series" motor $i_{ex}$ and $i_{1en}$ are identical, and the condition for torque production are favourable to maximal torque, (as in the commutator motor counterpart), and condensers can be omitted. It is understood that this system is the one of choice for small motors.

A phase shifting condenser would be here inserted parallel to the exciting winding if necessary.

The novel motor is so proposed in combination with a condenser, for improvement of operation and starting. It is to note however that the function of the condenser here, and of the condenser used in combination with the common induction motor is distinctly different. While with the induction motor of routine the condenser serves to produce a second phase of the supply of energy, for the generation of a rotating field, here the function of condensers are quasi opposite: it shifts the phase of the exciting flux to align with the phase of the rotor current.

Excessive starting currents in large units must be controlled with starting transformers rendering lower voltages.

There should be no novel problem to extend the principles set for the new motor for larger units, to design them with several pairs of exciting and energizing poles. Extension of all principles is also feasible to polyphase motors, by treating every phase separately as single phase motors. It is also possible to operate a single phase motor from a three phase supply with a three phase starter transformer having the secondary connected according to Scott, giving two phases in quadrature, for the energizing and exciting windings.

Figure 6N:
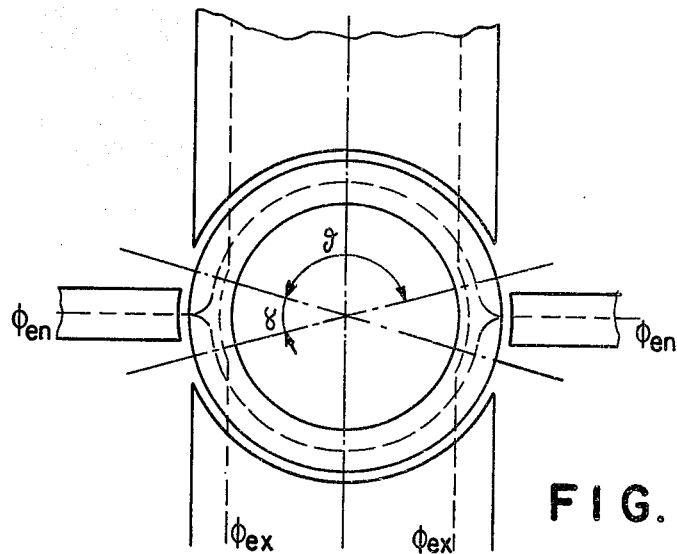

Because of the approximation $\Delta \cdot i_{1en} \cdot \cos \phi$(introduced watts)$=E_{v'} \cdot i_{2en}$; $i_{2en}$ can be calculated. $E_v=2\sqrt{2} \cdot n/60 \cdot \delta/\pi \cdot 2m \cdot \phi_{ex} 10^{-8}$ with n=RPM, $\delta$=angle of FIG. 6N; $E_2'=2\sqrt{2} \sim 60 \cdot \delta/\pi 2m \cdot \phi_{en} 10^{-8}$ Volt. $E_1=2\sqrt{2} \sim \alpha \cdot \phi_{en} \cdot t_{en} \cdot 10^{-8}$V. with $t_{en}$=Number of turns pertaining to the energizing winding; $\phi_{en}=(I_1 \cdot t_{en} + I_2 \cdot m/2 \cdot \delta/\pi)/R$ with R=magnetic reluctance to the energizing flux, $I_2=I_{bars}$ m=number of bars. This phylosophy is an analogy to the energy concept for machines with brushes. Namely: $i$(brush current)$\cdot \Delta$(on brushes)=approx.$2 \cdot i$(winding current) times (back electromotive force).

All presented constructions should be provided with means to reduce flux leakage. It is proposed to utilize the phenomena, that an AC flux projecting vertically on a surface of a highly conductive material, preferably in sheet form, is being absorbed to a major degree, because in the sheets are being generated concentric eddy currents, the sheets functioning as shields, and figuring as a secondary of a short circuited transformer.

Phasor diagram of FIG. 17 serves to illustrate the motor control by variation of supplied energy. Field $\phi_q$ is the cross field which lags in quadrature the EMF of rotation $E_{v'}$, and it is excited by an magnetizing current $i_{2m}$ of the same phase. This current must be supplied by the primary (the energizing winding) or in other words, when $I_{2m}$ is subtracted vectorially from $i_{1en} i_{2en}'$ results. We see again the triangle: ($E_2'E_{v'}E_{res}$) But when the RPM increase, $E_{v'}$ also increase to: $E_{vv'}$, what automatically demands also an increase of $E_2'$ to $E_{2v'}$, because the said triangle and $E_{res}$ must be preserved. Then the increased $E_{2v'}$ demands the same for $E_1$, and by consequence respectively also for $\Delta$, the supply.

In FIG. 7 for instance we see that the energizing flux leaving the solenoidal winding, bends inwardly against the concave surface of stator ring (3) for crossing of the airgap surrounding the rotor. However the leakage of this flux bends outwardly toward the convex surface of said ring against free space. 5 to 20% of the energizing flux may leak through air, without further precautions.

The proposed new motor find also his place in the scheme of the Unified and General theory of electrical machines. The latter is usually presented with the help of a considerable mathematical apparatus, but a geometrical approach based on structural characteristics renders a sketchy recount feasible.

All rotating electrical machinery comprises two fundamental axes: the exciting axis called here d=axis, and the energizing axis called here q=axis. Both axes are inclined against each other, the angle may have 90°. The normal DC machine has the exciting flux in the d-axis, and the brushes in the q-axis. For instance the inverted DC machine, has the d/q axis system rotating including the brushes, while the armature fixed in the stator. Both DC machines are double fed. The AC commutating machines are either also double fed or single fed, as the Repulsions motor, having the excitation axis in the d-axis, while the energy transfer to the rotor in the q-axis. (by induction). The Universal single phase motor is double fed, and may have a shorted compensation winding in the q-axis. The synchron machine is also double fed, and may have the energizing winding either in the stator or rotor, and both axis rotating and maintaining their relative angular inclination fixed. The induction motors are single fed, having the d/q axis system rotating, in the multiphase machine, and standing in the single phase motor. There the flux in the q-axis is generated by the revolving rotor. The new proposed machine is an induction machine, brushless, double fed, having the energy transfer in the q-axis, by induction, and the exciting flux in the d-axis. It resembles most the Repulsion motor, with a shorted rotor, but having replaced the shorting brushes, with a squirrel rotor comprising the shorting lateral conductive rings.

Therefore it is proposed to cover convex outer surfaces of stator rings, whereever windings are not preventing to do so, with thin sheets of copper, which will be effective in shielding leakage fluxes.

It is to note, that nowhere is permitted such shielding to embrace the main stream of any flux, because of electro-magnetic linkage and reduction of said flux by induced currents in phase opposition.

After having described this invention with basic theory, shown practical constructions, enumerated several applications, and detailed phasor diagrams of operation, including leads for the art to compute the physical dimensions I am claiming the invention, as follows without restriction also to devices, which could be designed with intercombinations of shown constructions.

I claim:

1. Induction motor energized by a source of AC power, comprising a conventional squirrel cage rotor (FIGS. 2 & 4; 13 in FIGS. 6 & 9) with shorted bars (9 in FIGS. 2 & 4), and shorting lateral rings (10 in FIG. 2), being surrounded by the conventional circular air-airgap; a stator system having two independend closed ferromagnetic paths (3, 5 in FIG. 1; 3, 5 in FIGS. 6, 7, 8, 9) each with two opposite ends, facing at two diametrically opposite spots said airgap; the first ferromagnetic path, called energizing path, provided with a first winding for the energization of said motor, and distinctly for the induction of torque producing currents in transformer action within the rotor bars (9 in FIGS. 3 & 4); the second ferromagnetic path, called exciting path, provided with a second winding, distinctly for the generation of a torque producing flux ($\phi_{ex}$ in FIGS. 6, 7, 8, 9) called exciting flux, the latter being approximately in phase with said induced currents; the cross section of said energizing ferromagnetic path (5 in FIGS. 1, 6, 7, 8, 9) to be substantially smaller then the cross section of said exciting ferromagnetic path (3 in FIGS. 1, 6, 7, 8, 9), representative values of this ratio to be about (1 to 3) to (1 to 4); said first winding called energizing winding (4 in 1, 6, 7, 8, 9); said second winding called exciting winding (6 in FIGS. 1, 6, 7, 8, 9), the latter being a component of a circuit comprising a phase shifting condenser (C in FIGS. 11a & 14) the energy fed into said energizing winding being substantially larger then the energy consumated in said exciting winding, both energies being in a ration, as for instance the energy fed into a commutator rotor through brushes, to the energy consumated for the excitation of a motor with commutator.

2. Induction motor according to claim 1, wherein said energizing flux and said exciting flux are crossing said squirrel cage rotor at right angles.

3. Induction motor according to claim 1, having both said ferromagnetic paths terminating against said airgap with formed pole-pieces (6 in FIGS. 6, 7, 9), said pole pieces pertinent to the energizing path extended over a substantially shorter arc of said circular airgap, then the ple pieces pertaining to the said exciting path, the ratio of said arcs being for instance comparable approximately to pole arcs pertaining to the commutating interpoles of DC machines to the main exciting poles of the latter machines.

4. Induction motor according to claim 1 having the ferromagnetic path joining a pair of pole pieces pertinent to the energizing flux composed of 3 straight yoke sections, all having the centerline in a right plane to the rotating shaft, the middle section directed parallel to the energizing flux while crossing the rotor, the adjacent two sections having attached the pole pieces, vertical to it; the ferro magnetic path joining a pair of pole pieces pertinent to the exciting flux, composed of two groups, each having 3 straight yoke sections, one group on each side of the rotary shaft, both symmetrical to it, two sections having the centerline parallel to the rotary shaft and attached to pole pieces, one section parallel to the exciting flux while crossing the rotor, each ferromagnetic yoke adapted to be embraced by at least one solenoidal coil.

5. Induction motor according to claim 1 having two circular ferromagnetic yokes, one pertaining to the energizing, the other to the exciting flux, each in one of two axially spaced right planes to the rotary shaft, both having a pair of diametrically opposed pole pieces attached projecting inwardly in a radial direction against said circular airgap, both yokes embraced by solenoidal coils belonging respectively to the energizing and the exciting winding, said ferromagnetic yokes split in two halfs along the centerline of each pole piece and free to permit a plurality of solenoidal coils to be mounted and fixed by sliding over as a core, said squirrel cage rotor to be extended in a direction of the rotary shaft so long as to permit electro magnetic interaction with all said pole pieces located in two said spaced right planes. (FIG. 7).

6. Induction motor according to claim 5 with the distinction of having incorporated mechanical conventional means to make both said ferromagnetic yokes rotatable against each other.

7. Induction motor according to claim 1 having the conventional circular airgap surrounding the squirrel cage rotor limited by two circular yokes having their centerlines in two right planes to the rotary shaft and spaced from each other, one pertaining to the energizing flux, the other to the exciting flux, both fluxes generated in chord windings embracing said rotor and located in slots on the inner perifery of said circular yokes, which are parallel to the rotary shaft, said rotor being extended axially so long as the axial extension of both said yokes plus for a distance between said yokes, which permits to locate the winding ends and terminals of both windings. (Reference to FIG. 8).

8. Induction motor according to claim 1, with the distinction of having incorporated in said circular ferromagnetic yoke pertaining to the exciting flux a winding composed of two groups, capable of generating exciting fluxes for the motor in two directions, for crossing said rotor, both directions being perpendicular to each other, one parallel to the energizing flux while crossing the rotor, each group executed as chord winding embedded in slots, parallel to the rotary shaft, and having also incorporated conventional means of electrical technology for the regulation of the relative intensity of both fluxes.

9. Induction motor comprising a construction principle of DC homopolar machinery having a stator (5 & 3 in FIG. 9) and a cylindrical rotor (13 in FIG. 9) surrounded on the convex cylindrical surface by an active airgap, with the distinction of having said rotor built as squirrel cage rotor, comprising the conventional conductive bars (9 in FIG. 4) shorted by lateral conductive rings (10 in FIG. 4); two stator windings, an energizing winding (4 in FIG. 9) and an exciting winding (6 in FIG. 9) connected to an AC source, said latter winding as component of a circuit comprising a phase shifting condenser (C in FIG. 14); said energizing winding generating a first flux, said exciting winding a second flux, said rotor energized by induction by said first flux, in transformer, action from said stator, called the energizing flux ($\phi_{en}$ FIG. 9), which is crossing said rotor diametrically in an axis, called the energizing axis, said rotor subjected to electromagnetic interaction to said second flux, also AC, the exciting flux ($\phi_{ex}$ FIG. 9) which is hitting through said active airgap the cylindrical rotor surface and the bars of said squirrel cage, in a radial direction vertical to said energizing axis and only once, then bending subsequently, in similarity to calssical DC homopolar machinery, for a right angle, to leave the domain of said cage of the rotor laterally parallel to the rotational axis through a surface defined by said lateral cage rings, said latter direction defining with said energizing axis and said radial direction a 3-axis orthogonal system, the ferromagnetic cross section pertaining to said exciting flux designed substantially larger, then the ferromagnetic cross section pertaining to said energizing flux, a representative value is 3 to 4 times.

* * * * *